United States Patent [19]
Lee et al.

[11] Patent Number: 5,933,401
[45] Date of Patent: Aug. 3, 1999

[54] OPTICAL PICKUP HAVING PLURAL OPTICAL SOURCES AND PLURAL OPTICAL DETECTORS

[75] Inventors: Chul-woo Lee; Dong-ho Shin, both of Seoul; Chong-sam Chung, Seongnam; Pyeong-yong Seong, Seoul; Kun-ho Cho, Suwon; Hyun-seob Choi, Suwon; Yong-hoon Lee, Suwon; Tae-kyoung Kim, Suwon; No-kyong Park, Suwon, all of Rep. of Korea

[73] Assignee: Samsung Electronics Co., Ltd., Suwon-City, Rep. of Korea

[21] Appl. No.: 08/869,754

[22] Filed: Jun. 5, 1997

Related U.S. Application Data

[60] Provisional application No. 60/019,450, Jun. 11, 1996.

[30] Foreign Application Priority Data

Jun. 7, 1996 [KR] Rep. of Korea ............. 96-20725

[51] Int. Cl.$^6$ ....................................... G11B 7/00
[52] U.S. Cl. ................. 369/112; 369/44.23; 369/94; 369/44.37
[58] Field of Search ............... 369/110, 112, 369/109, 44.23, 44.37, 94, 58

[56] References Cited

U.S. PATENT DOCUMENTS

| | | | |
|---|---|---|---|
| 5,636,190 | 6/1997 | Choi | 369/94 |
| 5,696,749 | 12/1997 | Brazas, Jr. et al. | 369/109 |
| 5,703,856 | 12/1997 | Hayashi et al. | 369/112 |
| 5,717,674 | 2/1998 | Mori et al. | 369/109 |
| 5,768,221 | 6/1998 | Kasami et al. | 369/94 |

*Primary Examiner*—Nabil Hindi
*Attorney, Agent, or Firm*—Staas & Halsey

[57] ABSTRACT

An optical pickup capable of compatibly adopting disks of different formats which are placed in an optical player includes a first optical source for emitting light having a predetermined wavelength, a second optical source for emitting light having a wavelength different from that of light emitted from the first optical source, an objective lens for focusing light emitted from the respective first and second optical sources on a recording medium placed in the optical player, a light path changing unit disposed on a light path between the first and second optical sources and the objective lens for changing the traveling path of incident light, a first optical detector for receiving light emitted from the first optical source and is incident via the recording medium and the light path changing unit, and a second optical detector for receiving light emitted from the second optical source and is incident via the recording medium and the light path changing unit.

15 Claims, 7 Drawing Sheets

OPTICAL PICKUP HAVING PLURAL OPTICAL SOURCES AND PLURAL OPTICAL DETECTORS

This is a Provisional Application Serial No. 60/019,450, filed Jun. 11, 1996.

BACKGROUND OF THE INVENTION

1. Field of the Invention

The present invention relates to an optical pickup, and more particularly, to an optical pickup capable of compatibly adopting disk-type recording media of different formats.

An optical pickup to be adopted in a digital video disk player (DVDP) which can record and reproduce information at a high density should be capable of recording and reproducing on not only a digital video disk (DVD) but also a CD family recording medium such as a compact disk (CD), CD-R (recordable), CD-I, CD-G, etc., in order to achieve compatibility.

However, while the standardized thickness of the existing CD family is 1.2 mm, the standardized thickness of the DVD is 0.6 mm due to an allowable error of the disk inclination, the numerical aperture of an objective lens, etc. Thus, when an optical pickup for a DVD records and reproduces information recorded on a CD, spherical aberrations are generated due to a difference in thicknesses of these media. A sufficient light intensity required for recording an information signal may not be obtained due to the spherical aberrations, or deterioration of a signal during reproduction may occur.

Also, optical sources for reproducing a DVD and a CD have different wavelengths, wherein the wavelength of the existing reproduction optical source for a CD is approximately 780 nm and that for a DVD is approximately 650 nm.

2. Description of the Related Art

A conventional compatible optical pickup capable of recording and reproducing information on disks having different formats as described above includes a single optical source for emitting light having a short wavelength of about 650 nm, suitable for the DVD format, and has an improved structure which can compensate for differences in the thicknesses of disks. As a result, disks of different formats may be interchangeably used in an apparatus adopting such a compatible optical pickup. In this case, deterioration in the intensity of about 5% is generated as compared to an optical pickup adopting an optical source for emitting a 780 nm-wavelength light, but since it is within the allowable error range for reproduction, such a problem is not serious.

However, when the CD-R as one of the CD family is adopted, a difference in sensitivity is generated when an optical source for emitting 650 nm wavelength light is used as compared to when an optical source for emitting 780 nm wavelength light is used. That is, since the CD-R has an organic dye film recording layer, the difference in reflectivity is significant depending on the wavelength of light, as shown in FIG. 1. Thus, when light having a wavelength of about 650 nm is used, the reflectivity is degraded to less than 10%, which makes signal reproduction impossible.

To overcome the above problem, as shown in FIG. 2, a conventional compatible optical pickup having a first optical source 21 for emitting a 635 nm wavelength light and a second optical source 31 for emitting a 780 nm wavelength light has been devised. The first optical source 21 is for a relatively thin disk 10a such as the DVD, and the second optical source 31 is for a relatively thick disk 10b such as the CD.

Light emitted from the first optical source 21 is reflected by a polarizing beam splitter 23, passed through an interference filter 33, a $\lambda/4$ retardation plate 11 and a hologram 13, and focused on a disk 10 by means of an objective lens 15. The light reflected from the disk 10, passes through the objective lens 15, the hologram 13, the $\lambda/4$ retardation plate 11, the interference filter 33, the polarizing beam splitter 23, and is incident upon an optical detector 17. The interference filter 33 reflects light emitted from the second optical source 31 through the $\lambda/4$ retardation plate 11, the hologram 13, and the objective lens 15 to the disk 10 and passes the light reflected by the disk 10 therethrough.

Since the light emitted from the first optical source 21 has a larger diameter than the diffracted pattern formed on the center of the hologram 13, it becomes light which is not diffracted even after it is passed through the hologram 13, that is, 0-order diffracted light, and is focused on the relatively thin disk 10a. On the other hand, the light emitted from the second optical source 31 is diffracted into the +1-order light by a diffracted pattern while it is passed through the hologram 13 and focused on the relatively thick disk 10b.

The compatible optical pickup can utilize the CD-R as a recording medium by employing two optical sources. However, the hologram on which the diffracted pattern is formed is in a position such that the assembly and the optical arrangement are difficult. Also, since a single optical detector is used, precise arrangement of optical axes emitted from two optical sources is needed.

SUMMARY OF THE INVENTION

To overcome the above problems, it is an object of the present invention to provide a simple-structured compatible optical pickup capable of compatibly adopting disks of different formats.

To accomplish the above object, there is provided a compatible optical pickup including a first optical source for emitting light having a predetermined wavelength; a second optical source to emit light having a wavelength different from that of the light emitted from the first optical source; an objective lens for focusing light emitted from the respective first and second optical sources on a recording medium; a light path changing unit disposed on light paths between the first and second optical sources, and the objective lens, to change the traveling path of incident light; a first optical detector to receive light emitted from the first optical source and incident via the recording medium and the light path changing unit; and a second optical detector to receive light emitted from the second optical source and incident via the recording medium and the light path changing unit.

The light path changing unit includes a first beam splitter disposed on a light path between the first optical source and the objective lens, to reflect light emitted from the first optical source toward the recording medium and to pass light reflected by the recording medium toward the first optical detector; a second beam splitter disposed on a light path between the first beam splitter and the objective lens, to reflect light emitted from the second optical source toward the recording medium and to pass light reflected by the recording medium; and a third beam splitter disposed on a light path between the first and second beam splitters, to reflect light emitted from the second optical source, reflected by the recording medium, and passed through the second beam splitter toward the second optical detector.

According to another aspect of the present invention, the light path changing unit includes a first beam splitter disposed on a light path between the first optical source and the objective lens, to reflect light emitted from the first optical source to the recording medium and to pass light reflected by the recording medium toward the first optical detector; a second beam splitter disposed on a light path between the first beam splitter and the objective lens, to reflect light emitted from the second optical source to the recording medium and to pass light reflected by the recording medium; and a third beam splitter disposed on a light path between the objective lens and the second beam splitter, to pass lights emitted from the first and second optical sources to the recording medium, passing light emitted from the first optical source and reflected by the recording medium, and to reflect light emitted from the optical source and reflected by the recording medium to the second optical detector.

According to still another aspect of the present invention, the light path changing unit includes a first beam splitter disposed on a light path between the first optical source and the objective lens, to pass light emitted from the first optical source to the recording medium and to reflect light reflected by the recording medium to the first optical detector; a second beam splitter disposed on a light path between the second optical source and the objective lens, to reflect light emitted from the second optical source and to pass light reflected by the recording medium toward the second optical detector; and a third beam splitter disposed on a light path between the first beam splitter and the objective lens, to reflect light emitted from the second optical source and reflected by the second beam splitter to the recording medium and to reflect light reflected by the recording medium to the second beam splitter.

According to still another aspect of the present invention, the first optical source and the first optical detector are installed adjacent to each other to constitute a first module.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
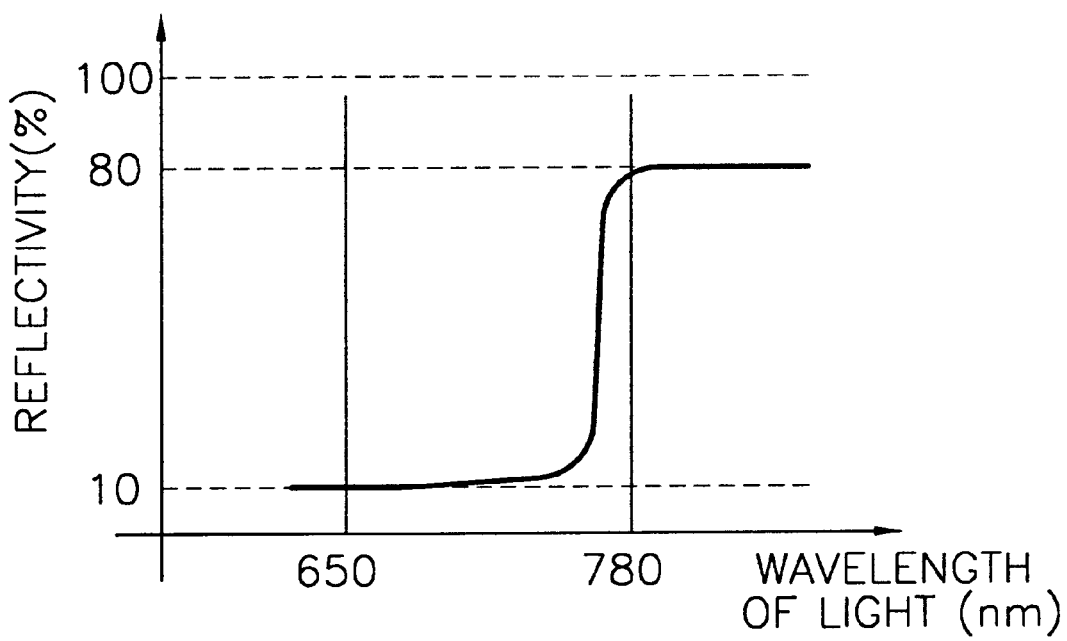
FIG. 1 is a graph showing the reflectivity according to the wavelength of an optical source when a CD-R is employed as a recording medium.
Figure 2:
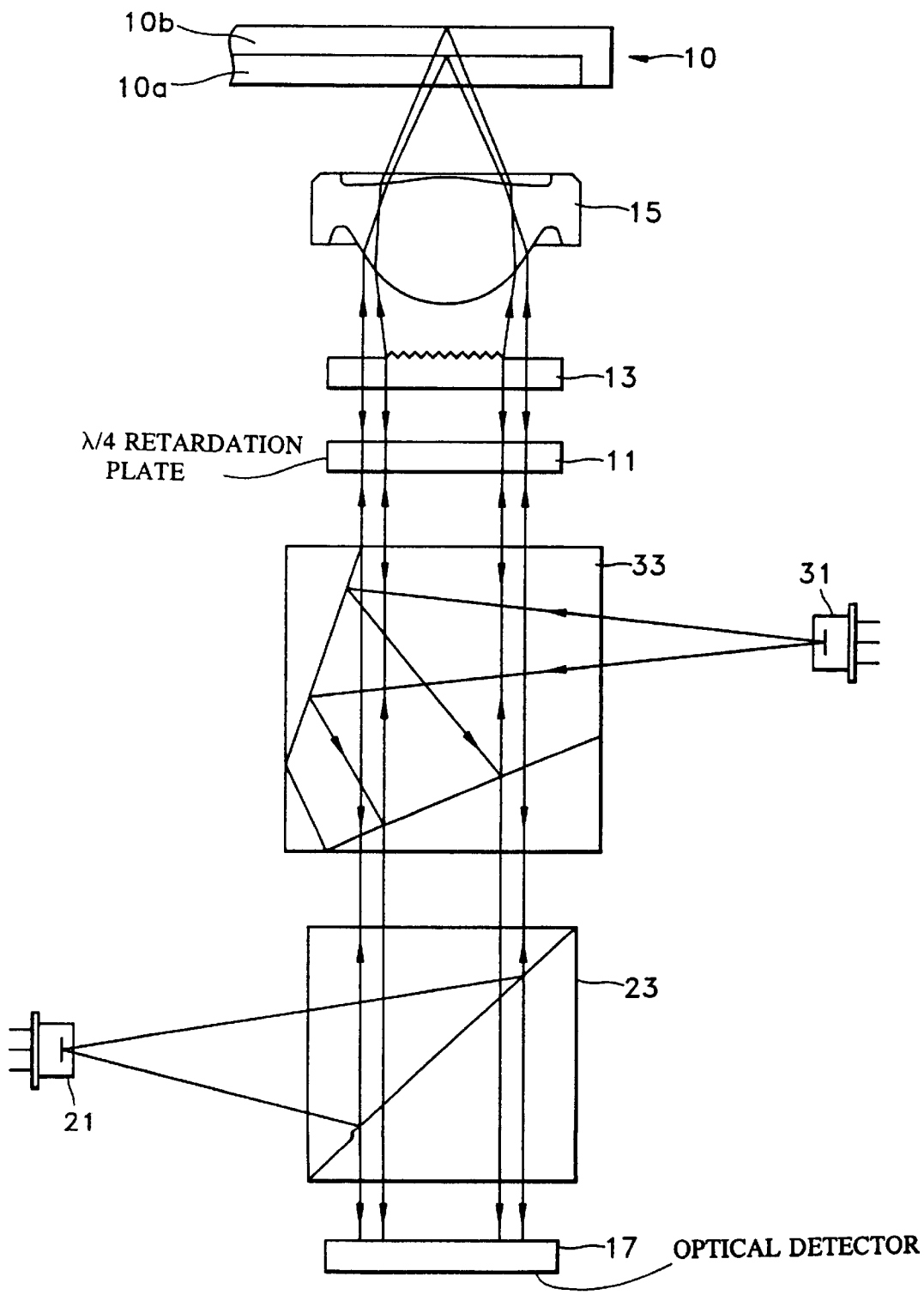
FIG. 2 is a schematic diagram showing an optical arrangement of a conventional compatible optical pickup.
Figure 3:
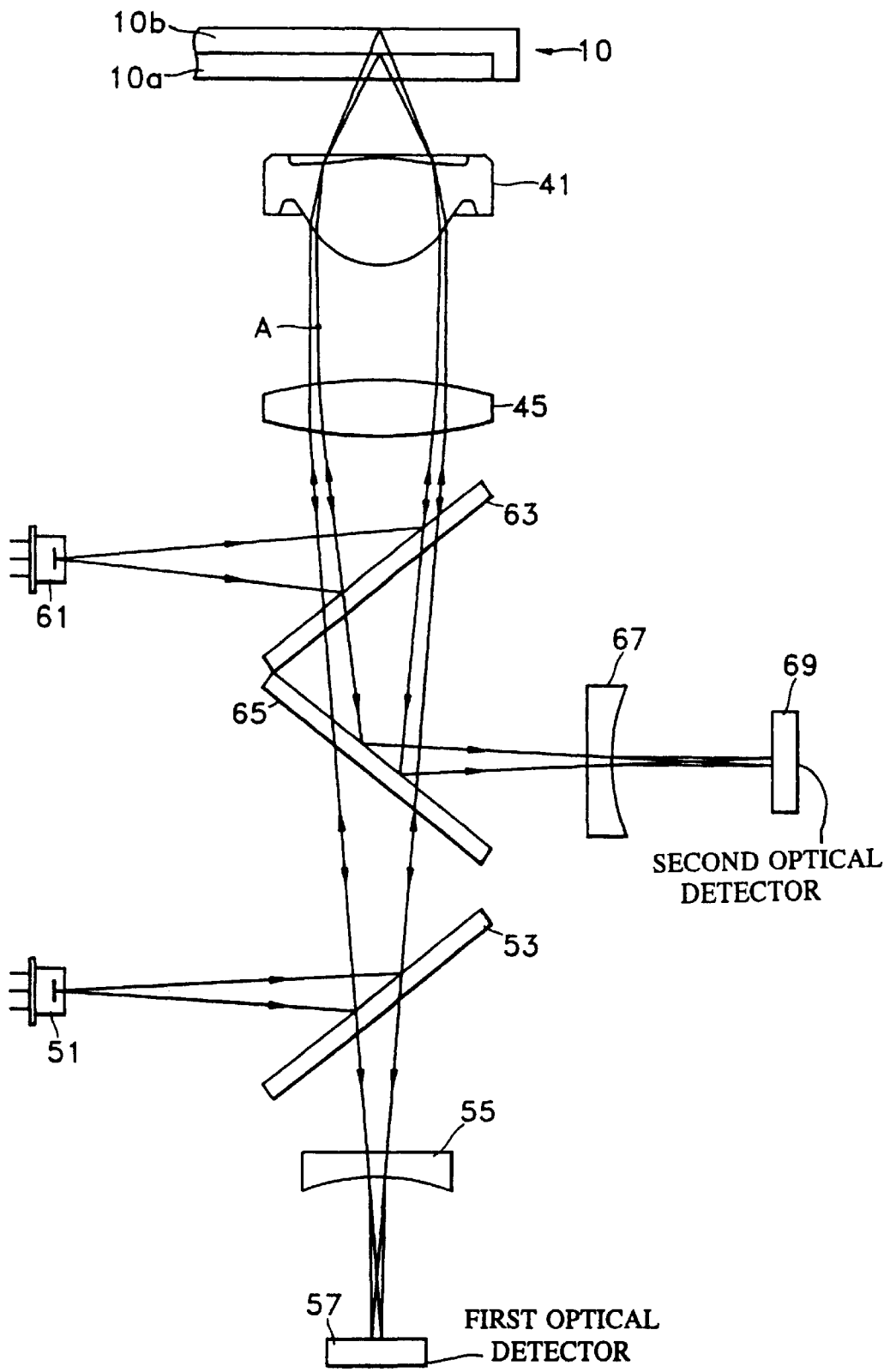
FIG. 3 is a schematic diagram showing an optical arrangement of a compatible optical pickup according to a first embodiment of the present invention.

As shown in FIG. 3, a compatible optical pickup according to a first embodiment of the present invention includes first and second optical sources 51 and 61 for producing and emitting laser light, first, second and third beam splitters 53, 63 and 65 as a light path changing unit disposed on the path of light for changing the traveling path of incident light, an objective lens 41 for focusing light emitted from the optical sources 51 and 61 on a recording medium 10, and first and second optical detectors 57 and 69 for receiving light reflected by the recording medium 10 and detecting an information signal and an error signal.

The first optical source 51 produces and emits light of about 650 nm, which can record on and reproduce information from a relatively thin disk 10a such as a DVD, a DVD-ROM, etc. The second optical source 61 produces and emits light of about 780 nm, which can record on and reproduce information from a relatively thick disk 10b such as a disk of the CD family, particularly, a CD-R.

The first and second optical sources 51 and 61 are disposed on different light paths, and they are selectively driven, with one operating according to the kind of recording medium 10. Here, the driving mechanism of the first and second optical sources 51 and 61 is either a manual method where a user selects an optical source suitable for the kind of the adopted recording medium 10 placed in an optical player or an automatic method where an optical source is selected by a separate detector (not shown) for detecting the kind of the recording medium 10 loaded in the optical player. Since the above-described driving mechanisms are widely known, a detailed description thereof will be omitted.

The objective lens 41 focuses light emitted from the first and second optical sources 51 and 61 to form an optical spot on the recording medium 10. The objective lens 41 is driven by an actuator (not shown) which is driven in directions towards and away from the recording medium 10 (up and down directions in FIG. 3) depending on a focus error signal and a track error signal.

Each of the first and second optical detectors 57 and 69 receives light which is respectively emitted from the first and second optical sources 51 and 61 and incident via the recording medium 10 and the first, second and third beam splitters 53, 63 and 65. Each of the first and second optical detectors 57 and 69 includes at least two plates (not shown) for receiving incident light and generating electrical signals corresponding to the light amount. The electrical signals output from the first and second optical detectors 57 and 69 are differentially and/or summingly amplified and utilized to detect the information signal, the tracking error signal and the focusing error signal.

The first beam splitter 53 is disposed on a light path between the first optical source 51 and the objective lens 41, and reflects light emitted from the first optical source 51 toward the recording medium 10 (through the third beam splitter 65, the second beam splitter 63, and the objective lens 41) and passes light reflected by the recording medium 10 toward the first optical detector 57. The first beam splitter 53 passes a portion of the incident light at a predetermined ratio and reflects the remainder. It is preferable that the first beam splitter 53 is flat as shown in the drawing. However, it may have a cubic shape which is obtained by combining two triangles. Here, the arrangement of the first optical source 51 and the first optical detector 57 can be regulated in conformity with the cubic-type structure.

The second beam splitter 63 is disposed on a light path between the first beam splitter 53 and the objective lens 41, and reflects light emitted from the second optical source 61 on the recording medium 10 (through the objective lens 41) and passes light reflected by the recording medium 10 therethrough.

Also, the third beam splitter 65 is disposed on a light path between the first and second beam splitters 53 and 63, and changes the traveling path of light so that light passed through the second beam splitter 63 after it is emitted from the second optical source 61 and reflected by the recording medium 10 travels toward the second optical detector 69. Each of the first, second and third beam splitters 53, 63 and 65 can be coated so that light in a predetermined wavelength area may be selectively passed therethrough or reflected thereby.

Here, the second and third beam splitters 63 and 65 can be flat or cubic. In the case that the second and third beam splitters 63 and 65 are flat, astigmatism due to the inclination of the two beam splitters 63 and 65 should not occur when light emitted from the first optical source 51 is passed therethrough. Accordingly, as shown, the second and third beam splitters 63 and 65 are inclined in opposite directions so that they can offset the astigmatism of each other. Preferably, there is a difference of 90° in inclination between the second and third beam splitters 63 and 65.

A collimating lens 45 can be further included on a light path between the objective lens 41 and the second beam splitter 63. Since the first optical source 51 is placed on the focus of the collimating lens 45, light emitted from the first optical source 51 and passed through the collimating lens 45 becomes parallel. On the other hand, since the second optical source 61 is disposed at a position departing from the focus of the collimating lens 45, i.e., a shorter position than the focal distance, light (A) emitted from the second optical source 61 and passed through the collimating lens 45 is diverged as light which is almost similar to the parallel light. As described above, divergence of the light from the second optical source 61 by the collimating lens 45 is for preventing generation of spherical aberrations according to a difference in thickness between different types of the recording medium 10 and the wavelength of an optical source which is used when the objective lens 41 is manufactured for a relatively thin disk 10a.

The light, which is emitted from the first optical source 51 and passed through the collimating lens 45 and the objective lens 41, is focused on a relatively thin recording medium 10a. The light, which is emitted from the second optical source 61 and passed through the collimating lens 45 and the objective lens 41, is focused on a relatively thick recording medium 10b.

Furthermore, a first sensor lens 55 may be included on a light path between the first beam splitter 53 and the first optical detector 57 so that the focus of light incident on the first optical detector 57 can be controlled. The first sensor lens 55 facilitates the optical arrangement of the first optical detector 57. Also, the curvature of the first sensor lens 55 is controlled so that the horizontal-direction focal position of light passed through the first sensor lens 55 may be different from the vertical-direction focal position thereof, which causes astigmatism. Accordingly, the first optical detector 57 can detect the focus error signal in an astigmatic manner.

A second sensor lens 67 may be further included on a light path between the third beam splitter 65 and the second optical detector 69. The configuration and function of the second sensor lens 67 are substantially the same as those of the first sensor lens 55.

Figure 4:
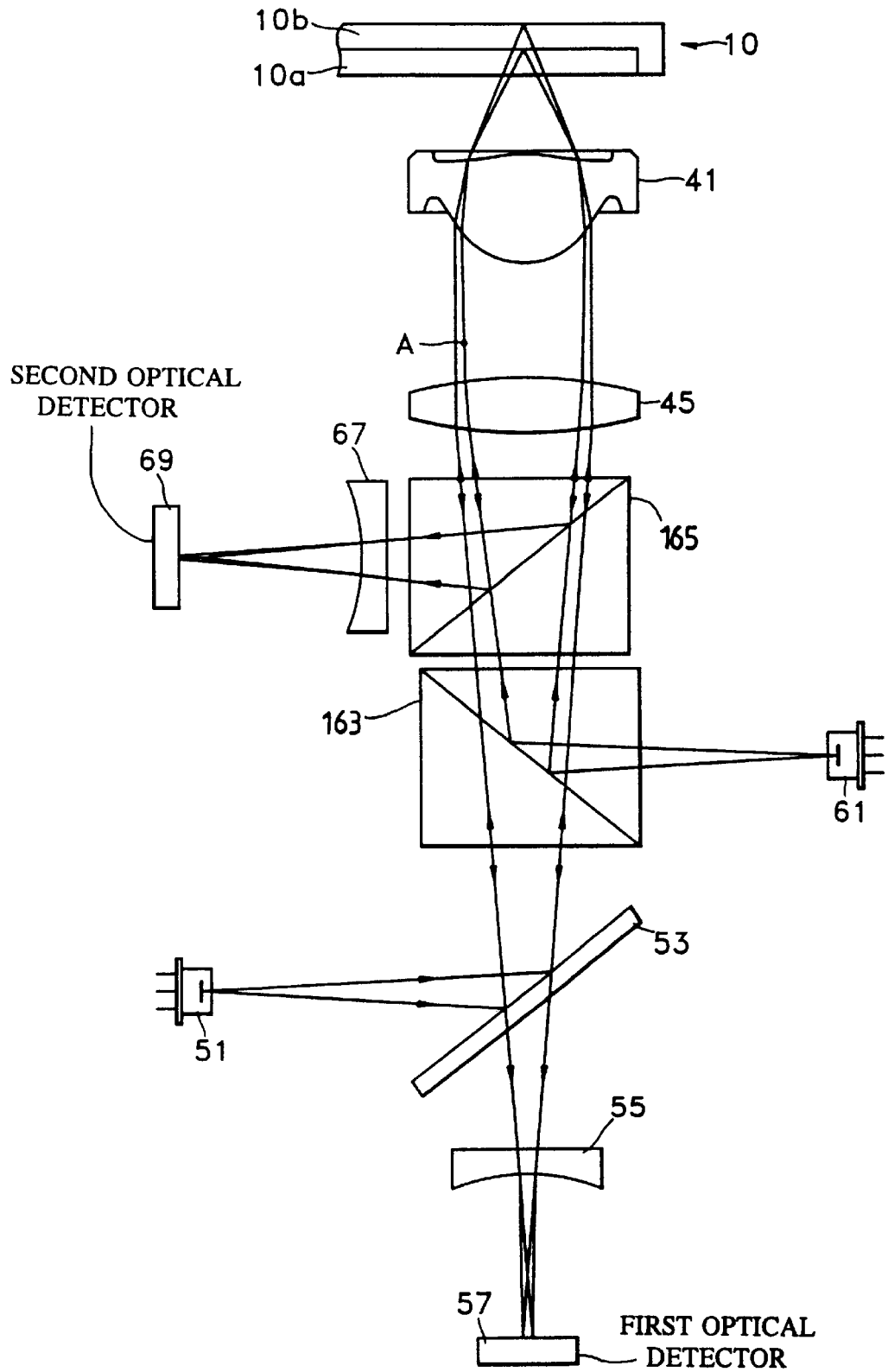
FIG. 4 is a schematic diagram showing an optical arrangement of a compatible optical pickup according to a second embodiment of the present invention.

A compatible optical pickup according to a second embodiment of the present invention is shown in FIG. 4. Here, reference numerals that are the same as those of FIG. 3 represent the same elements. Referring to FIG. 4, a second beam splitter 163 is disposed on a light path between the first beam splitter 53 and the objective lens 41, and reflects the light emitted from the second optical source 61 toward the recording medium 10 (through the third beam splitter 165 and objective lens 41) and passes light incident from the recording medium 10 therethrough.

The third beam splitter 165 is disposed on a light path between the objective lens 41 and the second beam splitter 163, and passes light incident from the first and second optical sources 51 and 61 therethrough and reflects the light emitted from the second optical source 61 and reflected by the recording medium 10 toward the second optical detector 69.

Here, it is preferable that the second and third beam splitters 163 and 165 are cubic as shown in FIG. 4 so that the shape of light emitted from the second optical source 61 may not be deformed by astigmatism.

Figure 5:
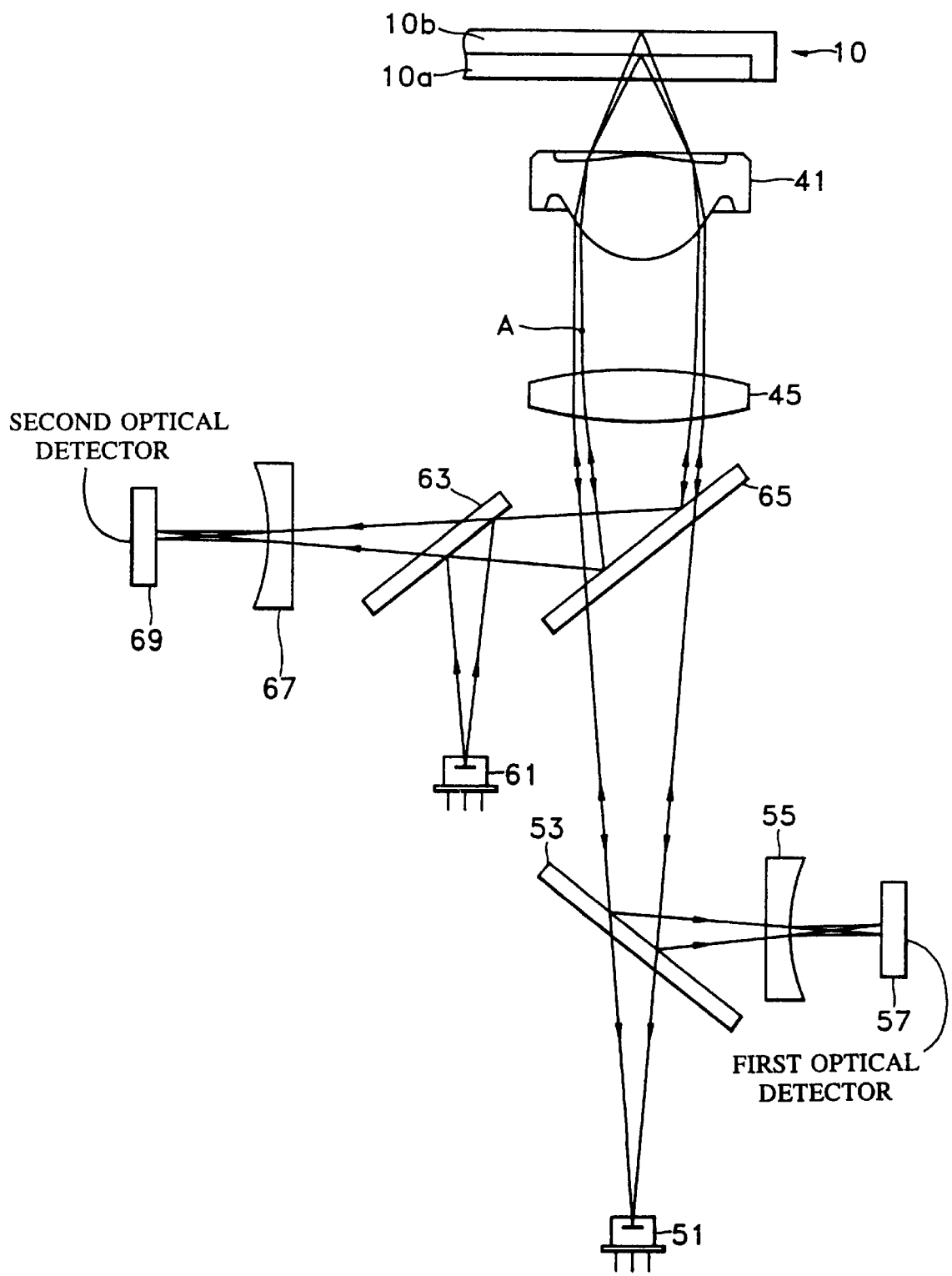
FIG. 5 is a schematic diagram showing an optical arrangement of a compatible optical pickup according to a third embodiment of the present invention.

A compatible optical pickup according to a third embodiment of the present invention is shown in FIG. 5. Here, like reference numerals represent the same elements. According to the characteristics of the present embodiment, a third beam splitter 65 is disposed on a light path between the first beam splitter 53 and the objective lens 41, and reflects light emitted from the second optical source 61 toward the recording medium 10 (through the objective lens 41) and reflects light incident from the recording medium 10.

The second beam splitter 63 is disposed on a light path between the second optical source 61 and the third beam splitter 65, reflects light emitted from the second optical source 61 toward the third beam splitter 65, and passes light incident from the third beam splitter 65 toward the second optical detector 69.

Here, it is preferable that the first, second and third beam splitters 53, 63 and 65 are flat as shown in FIG. 5. Here, the inclination of the first beam splitter 53 is opposite to that of the third beam splitter 65. Also, the first optical source 51 is disposed to be aligned in a straight line with the first beam splitter 53, the third beam splitter 65, the objective lens 41 and the recording medium 10.

The first, second and third beam splitters 53, 63 and 65 may be cubic or flat as mentioned above.

Figure 6:
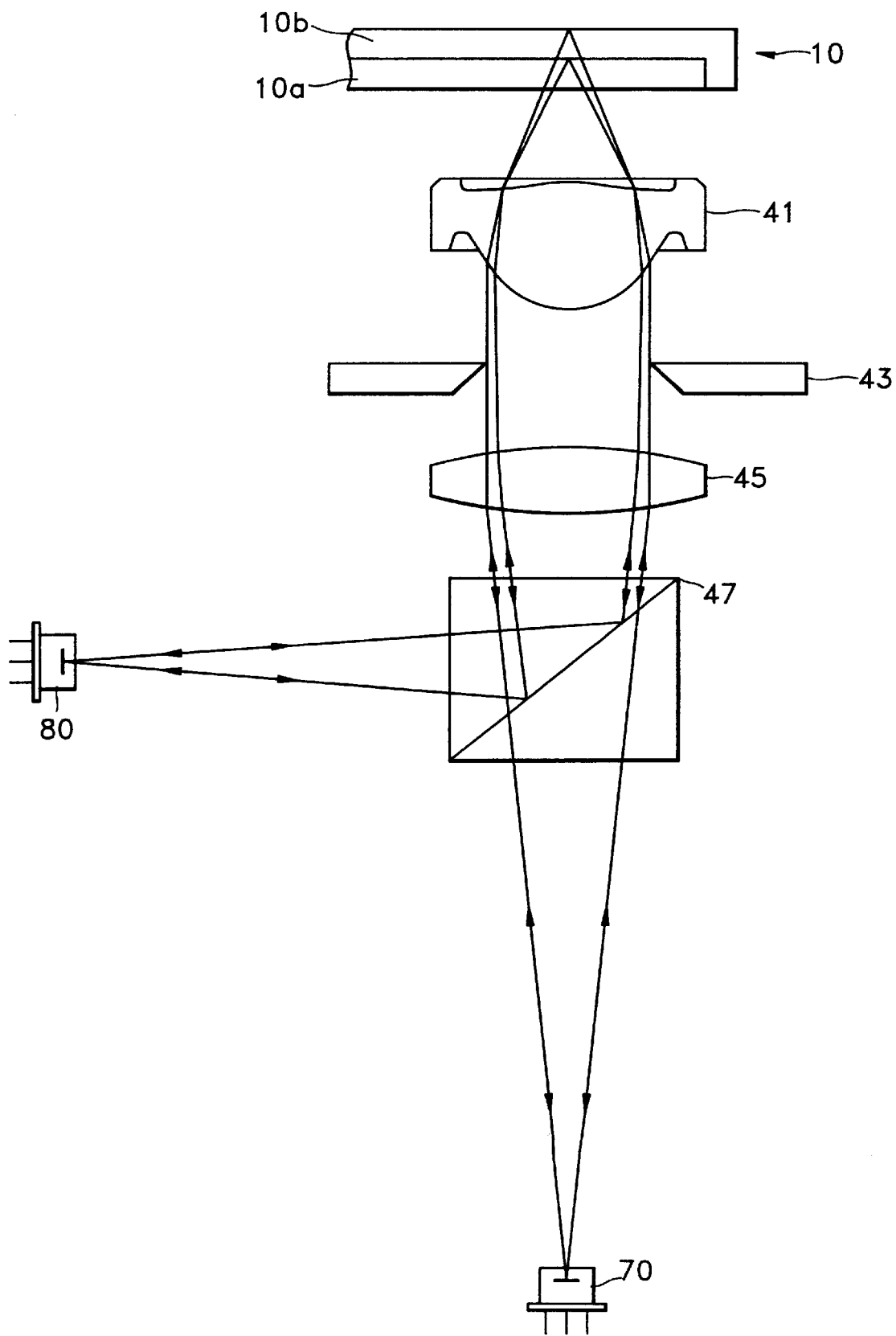
FIG. 6 is a schematic diagram showing an optical arrangement of a compatible optical pickup according to a fourth embodiment of the present invention.

As shown in FIG. 6, a compatible optical pickup according to a fourth embodiment of the present invention includes first and second optical modules 70 and 80 for emitting lights of different wavelengths and simultaneously receiving light reflected by the recording medium 10, an objective lens 41 for focusing light emitted from the first and second optical modules 70 and 80 on the recording surface of the recording medium 10, and a light path changing unit, such as a beam splitter 47, installed on a light path for changing the traveling path of incident light. Reference numerals that are the same as those of previous drawings represent the same elements.

According to the characteristics of the fourth embodiment, an optical source and an optical detector are incorporated in an optical module. In this case, there is no need to install the first beam splitter 53 (see FIG. 3) and the third beam splitter 65. Accordingly, since only one beam splitter 47 is included as a light path changing unit, the configuration of an optical system can be simply formed, and efficiency of light use can be increased. An aperture diaphragm 43 is between the objective lens 41 and the collimating lens 45, and has a diametrical aperture which is adjusted in accordance with the focused spot size on the disk being employed in the optical player.

Either one of the first and second optical modules 70 and 80 may include an optical source and an optical detector as described with reference to FIGS. 3 to 5.

Figure 7:
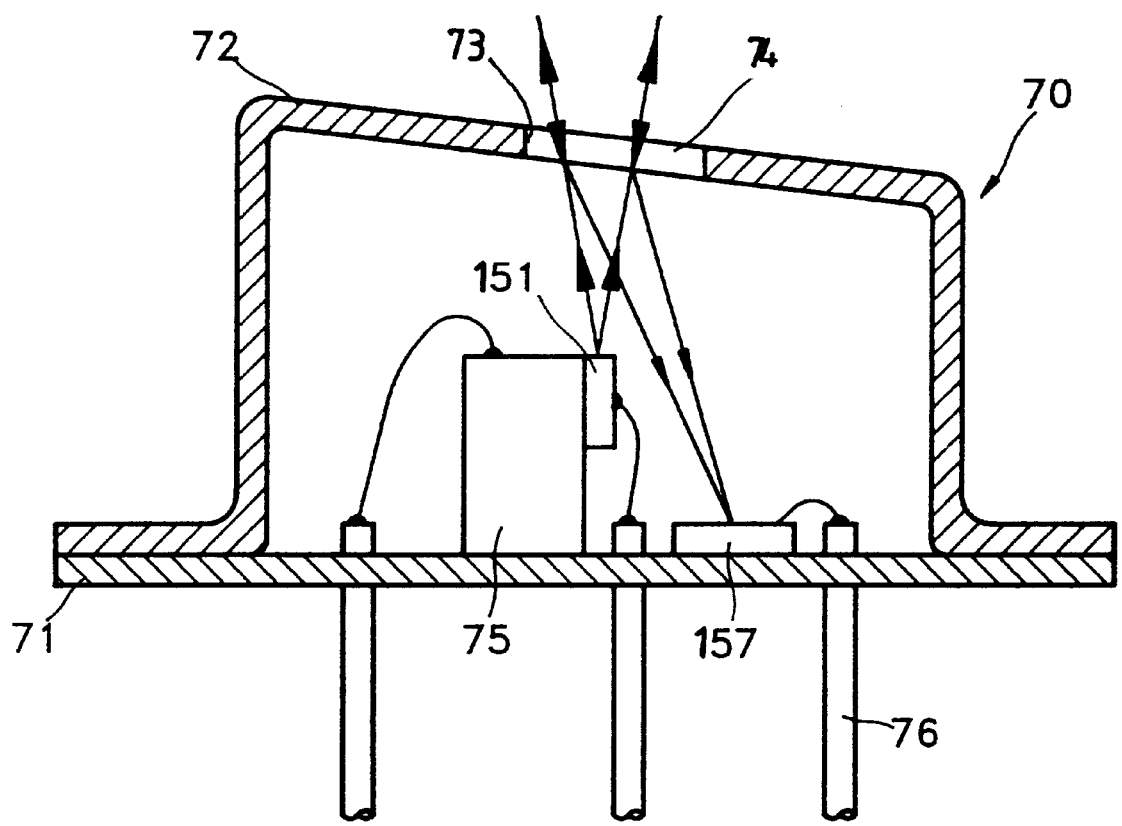
FIG. 7 is a schematic sectional view of an embodiment of a first module adopted in FIG. 6.

The first optical module 70, which can be adopted when the beam splitter 47 has a cubic-type structure, will be described with reference to FIG. 7. As shown in FIG. 7, the first optical module 70 includes a substrate 71 on which a first optical source 151 and a first optical detector 157 are installed, a housing 72 which covers the first optical source 151 and first optical detector 157 and has an emitting window 73 therethrough, and a hologram 74 installed in the emitting window 73.

When the first optical source 151 is an edge emitting laser, the first optical source 151 is connected to the substrate 71 by means of a mount 75. Also, the first optical module 70 includes a plurality of leads 76 penetrating and fixed to the substrate 71 to drive the first optical source 151 and the first optical detector 157.

The hologram 74 passes light straight from the first optical source 151 to the recording medium 10 of FIG. 6 and diffractingly passes the light reflected by the recording medium 10 toward the first optical detector 157.

The configuration of the second optical module 80 of FIG. 6 is the same as that of the first optical module 70, except that a second optical source (not shown) and a second optical detector each for emitting and detecting light of different wavelengths from the first optical source 151 and the first optical detector 157, respectively, are included.

When the beam splitter 47 is shaped like an inclined flat board, a hologram 74 of the first and second optical modules 70 and 80 is disposed aslant on a light path so that its inclination is opposite to that of the beam splitter 47. Thus, distortion of light from the first optical source 51 incident on the recording medium 10 can be prevented.

A compatible optical pickup according to the present invention includes first and second optical sources for emitting lights of different wavelengths, and can compatibly adopt disks of different thicknesses by selectively driving one of the optical sources depending on the kind of adopted recording medium and can prevent breakdown of data during reproduction of information recorded on a disk if the disk is of the CD family, especially, a CD-R having an organic dye recording layer thereon. Also, the selective use of two optical sources improves the life span of the optical pickup, and the use of two optical detectors facilitates the optical arrangement of each component part.

What is claimed is:

1. An optical pickup used in an optical device employing recording media of different formats, comprising:

a first optical source to emit light having a first predetermined wavelength;

a second optical source to emit light having a second predetermined wavelength different from said first predetermined wavelength;

an objective lens to focus light emitted from respective said first and second optical sources on first and second disk-type recording media of the recording media respectively;

light path changing means disposed on light paths between said first and second optical sources, and said objective lens, to change the traveling path of incident light emitted from said first and second optical sources;

a first optical detector for receiving the light emitted from said first optical source and incident via the first disk-type recording medium and said light path changing means; and a second optical detector to receive the light emitted from said second optical source and incident via the second disk-type recording medium and said light path changing means;

wherein said light path changing means comprises first through third beam splitters disposed on the light paths between said first optical source and said objective lens and between said second optical source and said objective lens, to direct the light from said first optical source and said second optical source to said objective lens to be transmitted to a corresponding one of the first and second disk-type recording media to be accessed, and to direct the light of said first optical source which passes through said objective lens to said first optical detector, and to direct the light of said second optical source which passes through said objective lens to said second optical detector; and wherein at least two of the first through third beam splitters are on a linear path with each other and at least one of the at least two beam splitters is inclined from the others of the at least two beam splitters in an opposite direction relative to a plane perpendicular to an optical axis of said objective lens to offset an astigmatism between each other.

2. An optical pickup as claimed in claim 1, wherein:

said first beam splitter is disposed on a first light path between said first optical source and said objective lens, to reflect the light emitted from said first optical source toward the first disk-type recording medium and to pass the light of said first optical source reflected by the first disk-type recording medium toward said first optical detector;

said second beam splitter is disposed on a second light path between said first beam splitter and said objective lens, to reflect the light emitted from said second optical source toward the second disk-type recording medium and to pass the light of said second optical source reflected by the second disk-type recording medium; and said third beam splitter is disposed on a third light path between said first and second beam splitters, to reflect the light emitted from said second optical source, reflected by the second disk-type recording medium, and passed through said second beam splitter toward said second optical detector.

3. An optical pickup as claimed in claim 2, further comprising a collimating lens to change a divergent light incident upon the light paths between said first and second optical sources, and said objective lens into a parallel light or light approximate to the parallel light.

4. An optical pickup as claimed in claim 3, wherein said second optical source is within a focal distance of said collimating lens such that the light emitted from said second optical source and passed through said collimating lens is divergent at a predetermined angle.

5. An optical pickup as claimed in claim 2, further comprising a first sensor lens to adjust the focus of light incident upon a forward light path of at least one of said first and second optical detectors.

6. An optical pickup as claimed in claim 1, wherein:

said first beam splitter is disposed on a first light path between said first optical source and said objective lens, to reflect the light emitted from said first optical source to the recording medium and to pass the light of said first optical source reflected by the first disk-type recording medium toward said first optical detector;

said second beam splitter is disposed on a second light path between said first beam splitter and said objective lens, to reflect the light emitted from said second optical source to the second disk-type recording medium and to pass the light of said second optical source reflected by the second disk-type recording medium; and said third beam splitter is disposed on a third light path between said objective lens and said second beam splitter, to pass the lights emitted from said first and second optical sources to the corresponding first and second disk-type recording media, to pass the light emitted from said first optical source and reflected by the first disk-type recording medium to said first optical detector, and to reflect the light emitted from said optical source and reflected by the second disk-type recording medium to said second optical detector.

7. An optical pickup as claimed in claim 6, further comprising a collimating lens to change a divergent light incident upon the light paths between said first and second optical sources, and said objective lens into a parallel light or light approximate to the parallel light.

8. An optical pickup as claimed in claim 7, wherein said second optical source is within a focal distance of said collimating lens such that the light emitted from said second optical source and passed through said collimating lens is divergent at a predetermined angle.

9. An optical pickup as claimed in claim 6, further comprising a first sensor lens to adjust the focus of light incident upon a forward light path of at least one of said first and second optical detectors.

10. An optical pickup as claimed in claim 1, wherein:

said first beam splitter is disposed on a first light path between said first optical source and said objective lens, to pass the light emitted from said first optical source to the first disk-type recording medium and to reflect the light of said first optical source reflected by the first disk-type recording medium toward said first optical detector;

said second beam splitter is disposed on a second light path between said second optical source and said objective lens, to reflect light emitted from said second optical source and to pass light of said second optical source reflected by the second disk-type recording medium toward said second optical detector; and said third beam splitter is disposed on a third light path between said first beam splitter and said objective lens, to reflect the light emitted from said second optical source and reflected by said second beam splitter to the second disk-type recording medium and to reflect the light of said second optical source reflected by the second disk-type recording medium toward said second beam splitter.

11. An optical pickup as claimed in claim 10, further comprising a collimating lens to change a divergent light incident upon the light paths between said first and second optical sources and said objective lens into a parallel light or a light approximate to the parallel light.

12. An optical pickup as claimed in claim 11, wherein said second optical source is within a focal distance of said collimating lens such that the light emitted from said second optical source and passed through said collimating lens is divergent at a predetermined angle.

13. An optical pickup as claimed in claim 2, wherein:

said first and second optical sources emit the light in substantially the same direction; and said first and second optical detectors are oriented at right angles relative to each other.

14. An optical pickup as claimed in claim 2, wherein said second and third beam splitters are flat devices which are inclined at substantially right angles relative to one another.

15. An optical pickup as claimed in claim 2, wherein said second and third beam splitters are cubic devices, each made of two pieces having triangular cross-sections, wherein a first surface of contact between the two pieces of the second beam splitter is inclined at substantially a right angle to a second surface of contact between the two pieces of the third beam splitter.

* * * * *